(12) United States Patent
Oyama et al.

(10) Patent No.: US 12,738,822 B2
(45) Date of Patent: Sep. 15, 2026

(54) PERMANENT MAGNET RECOVERY DEVICE AND PERMANENT MAGNET RECOVERY METHOD

(71) Applicant: HONDA MOTOR CO., LTD., Tokyo (JP)

(72) Inventors: Satoshi Oyama, Saitama (JP); Daisuke Yamamoto, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 777 days.

(21) Appl. No.: 18/145,855

(22) Filed: Dec. 23, 2022

(65) Prior Publication Data

US 2023/0208258 A1 Jun. 29, 2023

(30) Foreign Application Priority Data

Dec. 28, 2021 (JP) ................................ 2021-214038

(51) Int. Cl.
*H02K 15/50* (2025.01)
*H02K 15/03* (2025.01)

(52) U.S. Cl.
CPC ............. *H02K 15/50* (2025.01); *H02K 15/03* (2013.01)

(58) Field of Classification Search
CPC ...... H02K 15/50; H02K 15/03; H02K 1/2766; B09B 3/40; B09B 2101/15
See application file for complete search history.

(56) References Cited

U.S. PATENT DOCUMENTS

2015/0294786 A1* 10/2015 Zakotnik ............ H01F 41/0253 419/33
2017/0355183 A1* 12/2017 Menke ................. B32B 43/006
(Continued)

FOREIGN PATENT DOCUMENTS

CN 118253566 A 6/2024
JP H02220827 A 9/1990
(Continued)

OTHER PUBLICATIONS

Office Action issued Mar. 22, 2025 in the CN Patent Application No. 202211686763.7.

*Primary Examiner* — Thomas J Hong
*Assistant Examiner* — Jose K Abraham
(74) *Attorney, Agent, or Firm* — CKC & PARTNERS CO., LLC

(57) ABSTRACT

Provided are a permanent magnet recovery device and a permanent magnet recovery method capable of recovering, without degradation of permanent magnet properties, a permanent magnet attached to a laminated steel sheet, having an insulating film, via a resin material. A permanent magnet recovery device includes a heat-treating furnace that stores a permanent magnet holder in which permanent magnets are attached thereto, having insulating films, via a resin material and a high-frequency wave absorbent is provided at each end portion of the permanent magnet holder in a lamination direction of the laminated steel sheet so as to contact at least the resin material, and a microwave generator that emits microwaves into the heat-treating furnace. In this aspect, the permanent magnet holder is a predetermined rotating electrical machine rotor, and a high-frequency wave absorbent is further provided along an outer peripheral portion of the laminated steel sheet of the rotor.

6 Claims, 5 Drawing Sheets

(56) References Cited

U.S. PATENT DOCUMENTS

| | | | | |
|---|---|---|---|---|
| 2021/0367492 | A1* | 11/2021 | Ma | B29C 70/16 |
| 2022/0302804 | A1* | 9/2022 | Takeshima | H02K 1/2766 |
| 2024/0212928 | A1 | 6/2024 | Oyama et al. | |

FOREIGN PATENT DOCUMENTS

| | | | | | |
|---|---|---|---|---|---|
| JP | H11234972 | A | * | 8/1999 | |
| JP | 2001085223 | A | | 3/2001 | |
| JP | 2005209821 | A | | 8/2005 | |
| JP | 2012079947 | A | | 4/2012 | |
| JP | 2012147602 | A | * | 8/2012 | |
| JP | 2020078147 | A | | 5/2020 | |
| JP | 2020178511 | A | | 10/2020 | |
| WO | WO-2012073690 | A1 | * | 6/2012 | H02K 15/50 |

* cited by examiner 6
7
8
9
10
11
12
13

| | t1 | t2 | t3 |
|---|---|---|---|
| WITHOUT SiC | | | |
| WITH SiC | | | |

PERMANENT MAGNET RECOVERY DEVICE AND PERMANENT MAGNET RECOVERY METHOD

This application is based on and claims the benefit of priority from Japanese Patent Application No. 2021-214038, filed on 28 Dec. 2021, the content of which is incorporated herein by reference.

BACKGROUND OF THE INVENTION

Field of the Invention

The present invention relates to a permanent magnet recovery device and a permanent magnet recovery method.

Related Art

A technique of disassembling a magnetic circuit structure including laminated steel sheets to which permanent magnets are fixed with an adhesive, such as a rotor of a rotating electrical machine, and recovering the permanent magnets has been devised (see, e.g., Japanese Unexamined Patent Application, Publication No. 2001-85223). In the technique of Japanese Unexamined Patent Application, Publication No. 2001-85223, the magnetic circuit structure is heated to a high temperature in an oil furnace to carbonize the adhesive, and thereafter, the permanent magnets are recovered. Moreover, a technique of increasing the temperature of a laminated steel sheet covered with an adhesive coating by microwave heating to enhance adhesiveness of the adhesive coating has been devised (see, e.g., Japanese Unexamined Patent Application, Publication No. H11-234972).

Patent Document 1: Japanese Unexamined Patent Application, Publication No. 2001-85223

Patent Document 2: Japanese Unexamined Patent Application, Publication No. H11-234972

SUMMARY OF THE INVENTION

In the technique of Japanese Unexamined Patent Application, Publication No. 2001-85223, the magnetic circuit structure is heated to the high temperature in the oil furnace to purposely neutralize the permanent magnets. In this manner, the permanent magnets can be safely recovered. However, the expensive permanent magnets are recovered with original properties thereof degraded, and for this reason, there is a great loss in terms of reuse of resources. On the other hand, the technique of Japanese Unexamined Patent Application, Publication No. H11-234972 is a technique of strengthening bonding between layers of the laminated steel sheet. Thus, such a technique involves no concern on recovery of a particular recycle target such as a permanent magnet from a magnetic circuit structure. Thus, this technique is not suitable for a recycle purpose.

The present invention has been made in view of the above-described situation, and an object thereof is to provide a permanent magnet recovery device and a permanent magnet recovery method capable of recovering, without degradation of permanent magnet properties, a permanent magnet attached to a laminated steel sheet, having an insulating film, via a resin material. If the permanent magnet can be recovered without degradation of the properties thereof, the permanent magnet can be reused, an additional permanent magnet manufacturing process can be reduced, and a reduction in the burden on the environment, such as a reduction in carbon dioxide emissions, can be achieved.

(1) A permanent magnet recovery device (e.g., a later-described permanent magnet recovery device 1) includes a heat-treating furnace (e.g., a later-described heat-treating furnace 2) that stores a permanent magnet holder (e.g., a later-described permanent magnet holder 5) in which a permanent magnet (e.g., a later-described permanent magnet 8) is attached to a laminated steel sheet (e.g., a later-described laminated steel sheet 6), having an insulating film, via a resin material (e.g., a later-described resin material 7) and a high-frequency wave absorbent (e.g., a later-described high-frequency wave absorbent 10) is provided at each end portion of the permanent magnet holder in a lamination direction of the laminated steel sheet so as to contact at least the resin material, and a microwave generator (e.g., a later-described microwave generator 3) that emits a microwave into the heat-treating furnace.

(2) In the permanent magnet recovery device according to (1), the laminated steel sheet of the permanent magnet holder has an outer peripheral portion, and a high-frequency wave absorbent (e.g., a later-described high-frequency wave absorbent 12) is further provided along the outer peripheral portion.

(3) In the permanent magnet recovery device according to (1) or (2), the permanent magnet holder is a predetermined rotating electrical machine rotor (e.g., a later-described rotor 9).

(4) A permanent magnet recovery method includes a high-frequency wave absorbent attachment step (e.g., a later-described high-frequency wave absorbent attachment step S1) of attaching a high-frequency wave absorbent (e.g., a later-described high-frequency wave absorbent 10) to each end portion of a permanent magnet holder (e.g., a later-described permanent magnet holder 5), in which a permanent magnet (e.g., a later-described permanent magnet 8) is attached to a laminated steel sheet (e.g., a later-described laminated steel sheet 6), having an insulating film, via a resin material (e.g., a later-described resin material 7), in a lamination direction of the laminated steel sheet such that the high-frequency wave absorbent contacts at least the resin material, and a microwave heating step (e.g., a later-described microwave heating step S2) of heating, in a microwave heating furnace (e.g., a later-described microwave heating furnace 4), the permanent magnet holder to which the high-frequency wave absorbent has been attached in the high-frequency wave absorbent attachment step.

(5) In the permanent magnet recovery method according to (4), the laminated steel sheet of the permanent magnet holder has an outer peripheral portion, and a high-frequency wave absorbent (e.g., a later-described high-frequency wave absorbent 12) is further provided along the outer peripheral portion in the high-frequency wave absorbent attachment step.

(6) In the permanent magnet recovery method according to (4) or (5), in which the permanent magnet holder is a predetermined rotating electrical machine rotor (e.g., a later-described rotor 9).

In the permanent magnet recovery device according to (1), the high-frequency wave absorbent is provided at each end portion of the permanent magnet holder in the lamination direction of the laminated steel sheet so as to contact the resin material, and therefore, the end portions, which are difficult to be heated with microwaves, of the laminated steel sheet can be efficiently heated and a heating time necessary for permanent magnet recovery can be shortened. Consequently, the permanent magnet can be recovered without degradation of the properties thereof, an additional permanent magnet manufacturing process can be reduced, and a reduction in the burden on the environment, such as a reduction in carbon dioxide emissions, can be achieved.

In the permanent magnet recovery device according to (2), the high-frequency wave absorbent is further provided along the outer peripheral portion of the laminated steel sheet, and therefore, heat can also be transmitted to the resin material from the outer peripheral side and heating can be more efficiently performed.

In the permanent magnet recovery device according to (3), the permanent magnets can be, without degradation of the properties thereof, recovered from the rotating electrical machine rotor for which many high-performance permanent magnets are used, and therefore, the recovered permanent magnets are suitable for a reuse purpose.

In the permanent magnet recovery method according to (4), the high-frequency wave absorbent is provided at each end portion of the permanent magnet holder in the lamination direction of the laminated steel sheet so as to contact the resin material, and therefore, the end portions, which are difficult to be heated with microwaves, of the laminated steel sheet can be efficiently heated and the heating time necessary for permanent magnet recovery can be shortened. Consequently, the permanent magnet can be recovered without degradation of the properties thereof, an additional permanent magnet manufacturing process can be reduced, and a reduction in the burden on the environment, such as a reduction in carbon dioxide emissions, can be achieved.

In the permanent magnet recovery method according to (5), the high-frequency wave absorbent is further provided along the outer peripheral portion of the laminated steel sheet, and therefore, heat can also be transmitted to the resin material from the outer peripheral side and heating can be more efficiently performed.

In the permanent magnet recovery method according to (6), the permanent magnets can be, without degradation of the properties thereof, recovered from the rotating electrical machine rotor for which many high-performance permanent magnets are used, and therefore, the recovered permanent magnets are suitable for a reuse purpose.

BRIEF DESCRIPTION OF THE DRAWINGS

FIG. 5 is a view for describing action associated with the embodiment of the present invention;

DETAILED DESCRIPTION OF THE INVENTION

Figure 1:
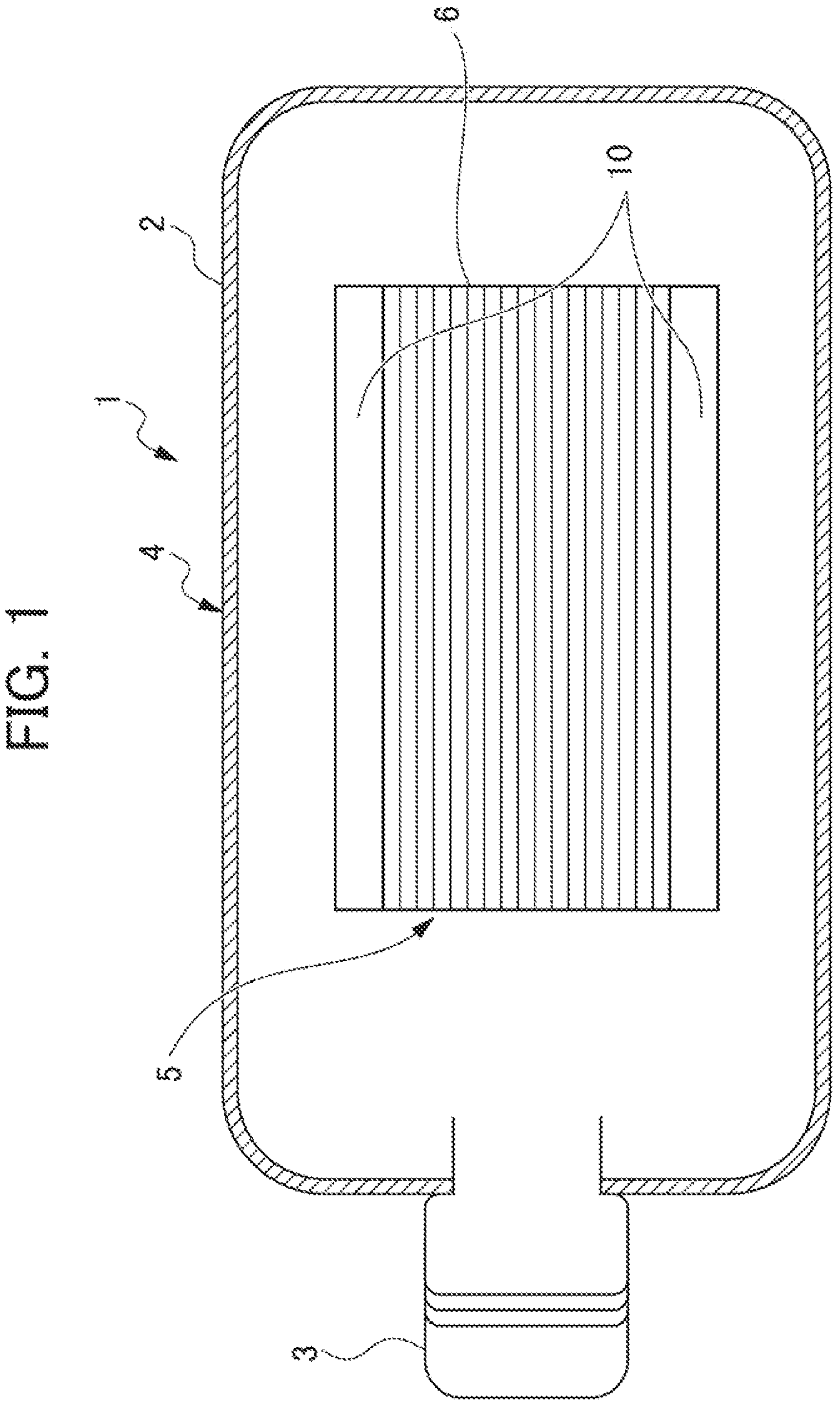
FIG. 1 is a conceptual diagram showing a permanent magnet recovery device according to an embodiment of the present invention.
Figure 2:
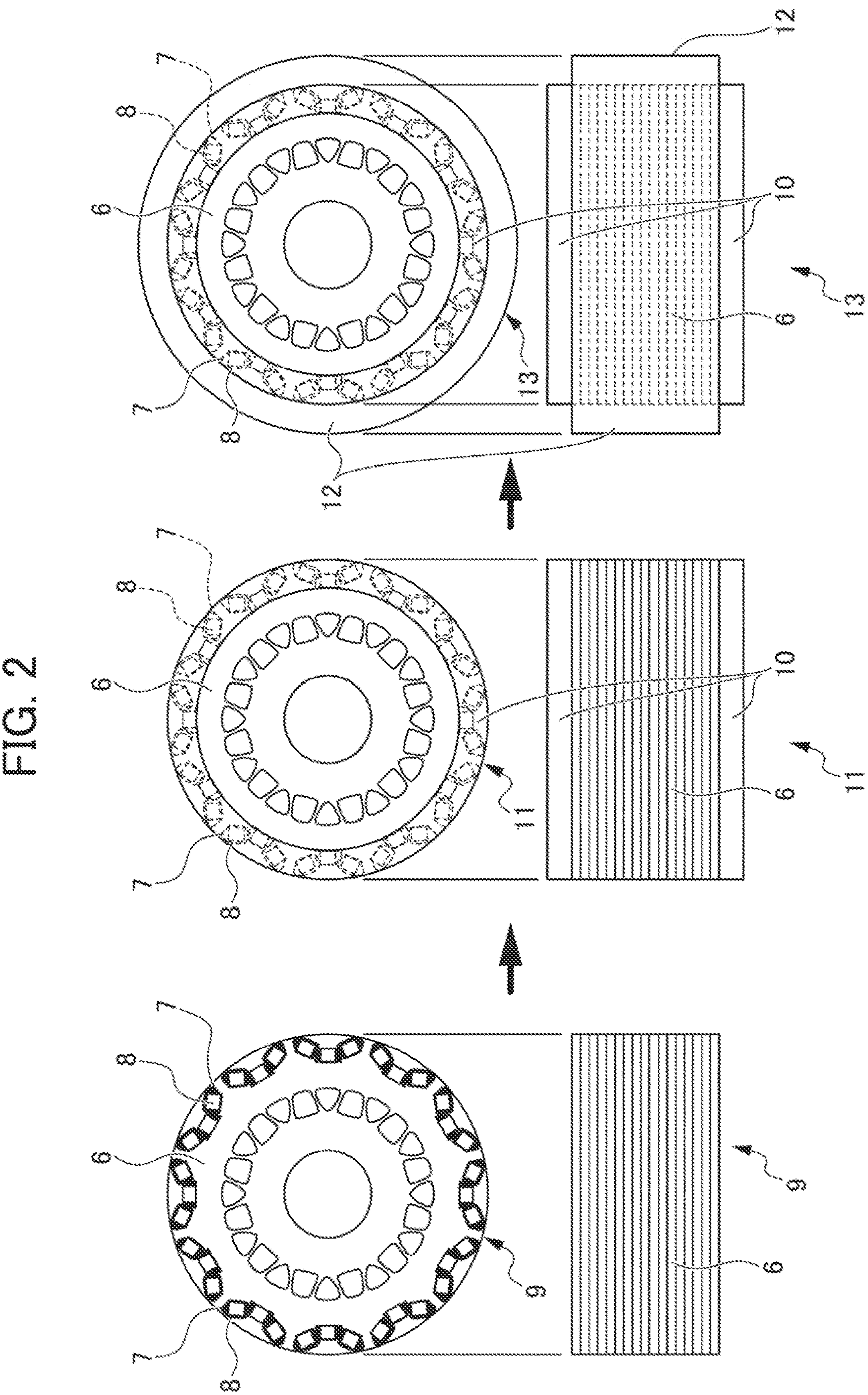
FIG. 2 is a view for describing a high-frequency wave absorbent attachment step in a permanent magnet recovery method according to the embodiment of the present invention.
Figure 3:
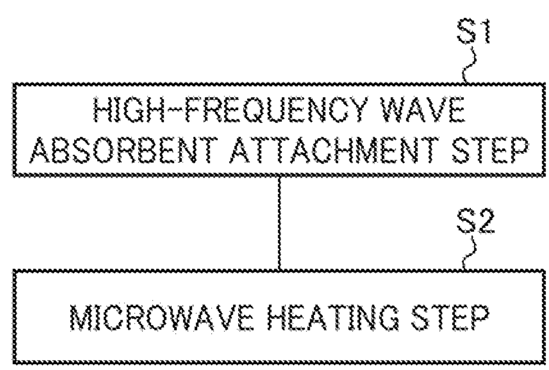
FIG. 3 is a flowchart of the permanent magnet recovery method according to the embodiment of the present invention.
Figure 4:
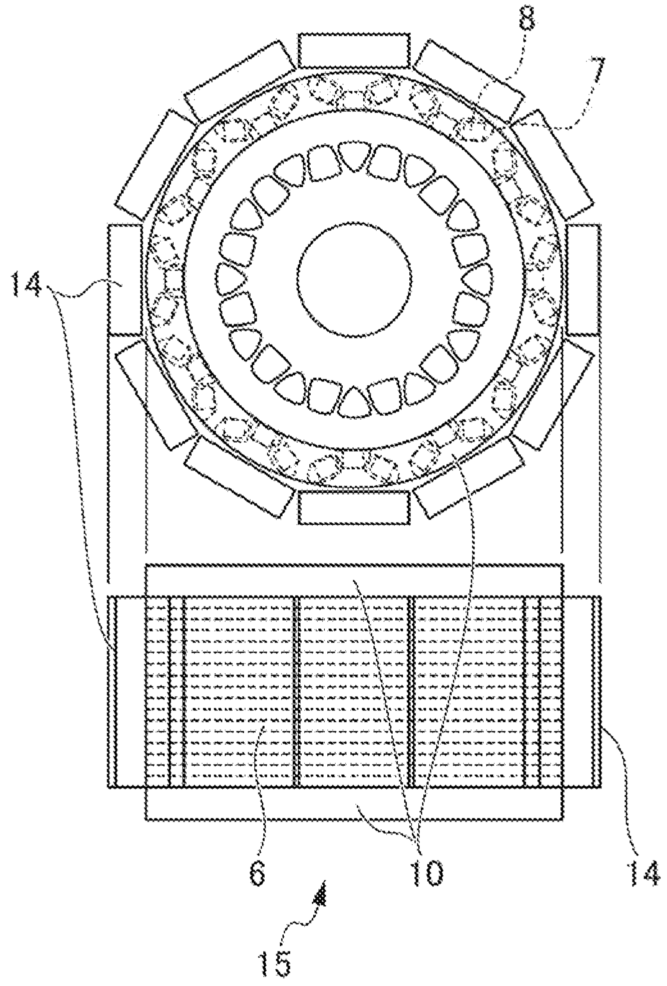
FIG. 4 is a view for describing another aspect of the embodiment of the present invention.

Next, an embodiment of the present invention will be described with reference to the drawings. In each figure described below, the same reference numerals are used to represent the same elements or corresponding elements. FIG. 1 is a conceptual diagram showing a permanent magnet recovery device 1 according to the embodiment of the present invention. FIG. 2 is a view for describing a high-frequency wave absorbent attachment step in a permanent magnet recovery method according to the embodiment of the present invention. FIG. 3 is a flowchart of the permanent magnet recovery method according to the embodiment of the present invention.

The permanent magnet recovery device 1 according to the embodiment of the present invention has a heat-treating furnace 2 that heats a treatment target and a microwave generator 3 that emits microwaves into the heat-treating furnace 2. The microwave generator 3 includes a magnetron, a waveguide, etc. The heat-treating furnace 2 and the microwave generator 3 form a microwave heating furnace 4. The permanent magnet recovery device 1 is in such a form that a particular permanent magnet holder 5 as the treatment target which is a target for heating is stored in the heat-treating furnace 2 of the microwave heating furnace 4.

The permanent magnet holder 5 is configured such that permanent magnets 8 are attached to a laminated steel sheet 6, having insulating films, via a resin material 7, and for example, is a disassembled rotating electrical machine rotor 9. The rotor 9 of this type is a permanent magnet embedded rotor, and is also called an interior permanent magnet (IPM) rotor. In the IPM rotor, many expensive high-performance rare-earth magnets are held.

As in FIG. 2, high-frequency wave absorbents 10 are attached to predetermined portions of the rotor 9 as the permanent magnet holder 5. In this example, the high-frequency wave absorbent 10 is attached to each end portion of the permanent magnet holder 5 in a lamination direction of the laminated steel sheet 6 so as to contact at least the resin material 7. As a result, the rotor 9 is in a first form of a treatment target 11 in which the high-frequency wave absorbents 10 are each attached to peripheral edge regions of the rotor 9 at both end surfaces in an axial direction of the rotor 9.

The permanent magnet recovery method according to the embodiment of the present invention includes a high-frequency wave absorbent attachment step S1 and a microwave heating step S2, as shown in FIG. 3. The high-frequency wave absorbent attachment step S1 is a step of forming the rotor 9 of FIG. 2 into the first form of the treatment target 11. Subsequently, in the microwave heating step S2, the treatment target 11 in the first form is stored in the heat-treating furnace 2 of the microwave heating furnace 4, and is heated with the microwaves from the microwave generator 3.

In the high-frequency wave absorbent attachment step S1, the treatment target 11 in the first form may be formed into a second form of a treatment target 13 in such a manner that a cylindrical high-frequency wave absorbent 12 is further attached so as to surround an outer peripheral portion of the laminated steel sheet 6 of the treatment target 11 in the first form. Note that in the high-frequency wave absorbent attachment step S1, a treatment target 15 in a third form may be formed in such a manner that a plurality of plate-shaped high-frequency wave absorbents 14 is attached so as to surround the outer peripheral portion of the laminated steel sheet 6 of the treatment target 11 in the first form.

Figure 5:
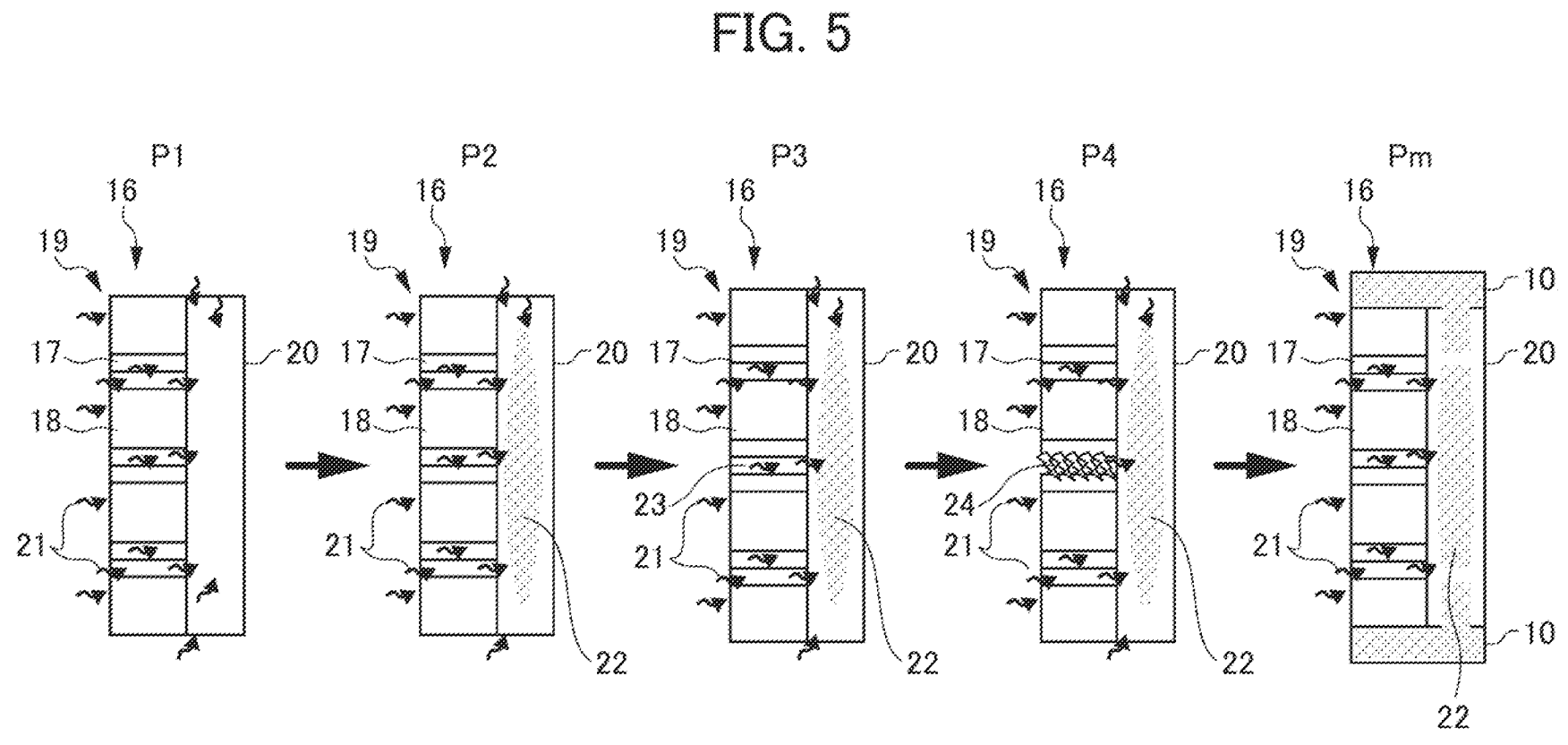

FIG. 5 is a schematic view showing a process of heating a treatment target in the heat-treating furnace 2 of the microwave heating furnace 4. The treatment target assumed in FIG. 5 is a portion of a rotating electrical machine rotor 9 including a laminated steel sheet 6 having insulating films and a resin material 7 holding permanent magnets 8. In FIG.

5, a reference numeral 16 is assigned to the treatment target assumed as described above. In the treatment target 16, a laminated body 19 in which magnetic steel sheets 18 are stacked on each other via insulating layers 17 is formed corresponding to the laminated steel sheet 6 of the rotor 9. An adhesive 20 corresponding to the resin material 7 holding the permanent magnets 8 in the rotating electrical machine rotor 9 adheres to a side end portion of the laminated body 19 along a lamination direction. The treatment target 16 is irradiated with microwaves 21.

In an initial first phase P1 in which irradiation of the treatment target 16 with the microwaves 21 is started, the microwaves 21 are reflected on the magnetic steel sheets 18 which are metal sheets, but propagate to the adhesive 20 through the insulating layers 17. In a subsequent second phase P2, a high-temperature region 22 temperature-increased by the microwaves 21 starts expanding from a center portion in the adhesive 20. That is, the adhesive 20 is heated starting from the center portion.

After the adhesive 20 has been further temperature-increased, the adhesive 20 is softened and expanded. Accordingly, a third phase P3 is brought, in which each gap 23 between the magnetic steel sheets 18 is expanded. In the third phase P3, there is a great potential difference in the gap 23, and eventually, electrical breakdown occurs in the gap 23. Accordingly, the state of a fourth phase P4 is brought, in which sparks 24 fly. In the fourth phase P4, the magnetic steel sheets 18 are heated by the sparks 24.

In the fourth phase P4, even if the high-temperature region 22 appears in the central portion, the temperature does not rise to peripheral regions near both ends in the stacking direction of the electromagnetic steel sheets 18. If the high-frequency wave absorbent 10 is attached to each end portion, which includes a portion of the adhesive 20, of the treatment target 16 in the lamination direction of the magnetic steel sheets 18, the high-frequency wave absorbents 10 are heated with the microwaves 21, and such heat is transmitted to the adhesive 20. Accordingly, the high-temperature region 22 expands across the substantially entire region in the adhesive 20, and an optimal phase Pm in which optimal heating can be performed is brought. In the optimal phase Pm, the portions of the adhesive 20 as local regions of the treatment target 16 are selectively temperature-increased, and adhesive force of such an adhesive 20 is neutralized. Thus, the permanent magnets can be easily taken out. In this case, the permanent magnets are not temperature-increased much, and therefore, can be recovered without degradation of permanent magnet properties.

Figures 6, 7:
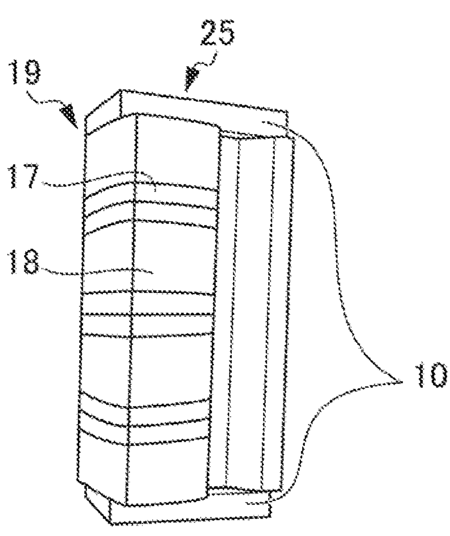
FIG. 6 is a view showing a target of experiment conducted in association with the present invention.
FIG. 7 is a table showing experimental results for the target of FIG. 6.

Next, results of experiment conducted for checking the action depicted in FIG. 5 will be described with reference to FIGS. 6 and 7. FIG. 6 shows a test piece 25 used for this experiment. The test piece 25 is a replica of part of a rotating electrical machine rotor. The test piece 25 is configured such that silicon carbide (SiC) plate-shaped bodies as high-frequency wave absorbents 10 are attached to upper and lower end surfaces of a laminated body 19 in a lamination direction thereof, the laminated body 19 being a replica of a rotor body portion and being configured such that magnetic steel sheets 18 are stacked on each other via insulating layers 17.

FIG. 7 is a table showing an overview of a state when temperature distribution in the laminated body 19 in association with irradiation with microwaves is observed over time in comparison between a case where the high-frequency wave absorbents 10 of the test piece 25 of FIG. 6 are detached and a case where the high-frequency wave absorbents 10 are attached. In FIG. 7, the higher the dot density, the higher the temperature. An elapsed time in irradiation with the microwaves in time-series observation in FIG. 7 is in a relationship of $t1<t2<t3$. As seen from FIG. 7, the internal temperature of the laminated body 19 increases in both the case of attaching the SiC plate-shaped bodies and the case of not attaching the SiC plate-shaped bodies as the elapsed time in irradiation with the microwaves increases. However, the case of not attaching the SiC plate-shaped bodies shows such temperature distribution that even when the elapsed time in irradiation with the microwaves reaches t3, the center portion in the laminated body 19 is temperature-increased, but the peripheral portion is not temperature-increased much. On the other hand, in the case of attaching the SiC plate-shaped bodies, when the elapsed time in irradiation with the microwaves reaches t3, the inside of the laminated body 19 is uniformly temperature-increased from the center portion to the peripheral portion. These experimental results show effectiveness of attachment of the SiC plate-shaped body as the high-frequency wave absorbent 10 to each end portion in the lamination direction of the magnetic steel sheets 18 for recovering the permanent magnets 8 from the rotating electrical machine rotor 9 which is the permanent magnet holder 5 holding the permanent magnets 8 on the laminated steel sheet 6 in which the magnetic steel sheets 18 are stacked on each other via the insulating layers 17.

According to the permanent magnet recovery device and the permanent magnet recovery method of the present embodiment, the following advantageous effects are produced.

The permanent magnet recovery device 1 according to (1) includes the heat-treating furnace 2 that stores the permanent magnet holder 5 in which the permanent magnets 8 are attached to the laminated steel sheet 6, having the insulating films, via the resin material 7 and the high-frequency wave absorbent 10 is provided at each end portion of the permanent magnet holder 5 in the lamination direction of the laminated steel sheet 6 so as to contact at least the resin material 7, and the microwave generator 3 that emits the microwaves into the heat-treating furnace 2. With this configuration, the end portions, which are difficult to be heated with the microwaves, of the laminated steel sheet can be efficiently heated, and a heating time necessary for permanent magnet recovery can be shortened. Consequently, the permanent magnets can be recovered without degradation of the properties thereof, an additional permanent magnet manufacturing process can be reduced, and a reduction in the burden on the environment, such as a reduction in carbon dioxide emissions, can be achieved.

In the permanent magnet recovery device according to (2), the laminated steel sheet 6 of the permanent magnet holder 5 has the outer peripheral portion, and the high-frequency wave absorbent 12 is further provided along the outer peripheral portion. With this configuration, heat can also be transmitted to the resin material 7 from the outer peripheral side, and heating can be more efficiently performed.

In the permanent magnet recovery device according to (3), the permanent magnet holder 5 is the predetermined rotating electrical machine rotor 9. The permanent magnets 8 can be, without degradation of the properties thereof, recovered from the rotating electrical machine rotor 9 for which many high-performance permanent magnets 8 are used, and therefore, the recovered permanent magnets are suitable for a reuse purpose.

The permanent magnet recovery method according to (4) includes the high-frequency wave absorbent attachment step S1 of attaching the high-frequency wave absorbent 10 to each end portion of the permanent magnet holder 5, in which the permanent magnets 8 are attached to the laminated steel sheet 6, having the insulating films, via the resin material 7, in the lamination direction of the laminated steel sheet 6 such that the high-frequency wave absorbent 10 contacts at least the resin material 7, and the microwave heating step S2 of heating, in the microwave heating furnace 4, the permanent magnet holder 5 to which the high-frequency wave absorbent 10 has been attached in the high-frequency wave absorbent attachment step S1. With this configuration, the end portions, which are difficult to be heated with the microwaves, of the laminated steel sheet 6 can be efficiently heated, and the heating time necessary for recovery of the permanent magnets 8 can be shortened. Consequently, the permanent magnets 8 can be recovered without degradation of the properties thereof, an additional permanent magnet manufacturing process can be reduced, and a reduction in the burden on the environment, such as a reduction in carbon dioxide emissions, can be achieved.

In the permanent magnet recovery method according to (5), the laminated steel sheet 6 of the permanent magnet holder 5 has the outer peripheral portion, and the high-frequency wave absorbent 12 is further provided along the outer peripheral portion in the high-frequency wave absorbent attachment step S1. With this configuration, heat can also be transmitted to the resin material 7 from the outer peripheral side of the laminated steel sheet 6, and heating can be more efficiently performed.

In the permanent magnet recovery method according to (6), the permanent magnet holder 5 is the predetermined rotating electrical machine rotor 9. The permanent magnets 8 can be, without degradation of the properties thereof, recovered from the rotating electrical machine rotor 9 for which many high-performance permanent magnets 8 are used, and therefore, the recovered permanent magnets are suitable for a reuse purpose.

The embodiment of the present invention has been described above, but the present invention is not limited to above. Details may be changed as necessary within the scope of the gist of the present invention. For example, in description above, the example where the permanent magnet holder is a rotating electrical machine rotor and the permanent magnets are recovered from such a rotor has been described. However, the present invention may be applied to a case where a permanent magnet holder is a medical tool using permanent magnets and the permanent magnets are recovered from such a medical tool.

EXPLANATION OF REFERENCE NUMERALS

1 Permanent Magnet Recovery Device
2 Heat-Treating Furnace
3 Microwave Generator
4 Microwave Heating Furnace
5 Permanent Magnet Holder
6 Laminated Steel Sheet
7 Resin Material
8 Permanent Magnet
9 Rotor
10 High-Frequency Wave Absorbent
11 Treatment Target in First Form
12 High-Frequency Wave Absorbent
13 Treatment Target in Second Form
14 High-Frequency Wave Absorbent
15 Treatment Target in Third Form
16 Treatment Target
17 Insulating Layer
18 Magnetic Steel Sheet
19 Laminated Body
20 Adhesive
21 Microwave
22 High-Temperature Region
23 Gap
24 Spark
25 Test Piece

What is claimed is:

1. A permanent magnet recovery device comprising:

a heat-treating furnace that stores a permanent magnet holder in which a permanent magnet is attached to a laminated steel sheet, having an insulating film, via a resin material and a cylindrical shaped high-frequency wave absorbent is provided at each end portion of the permanent magnet holder in a lamination direction of the laminated steel sheet so as to contact at least the resin material; and a microwave generator that emits microwave into the heat-treating furnace, wherein the high-frequency wave absorbent is heated, the resin material is heated by heat from the heated high-frequency wave absorbent, by which the permanent magnet is recovered without degrading the properties of the permanent magnet.

2. The permanent magnet recovery device according to claim 1, wherein the laminated steel sheet of the permanent magnet holder has an outer peripheral portion and the high-frequency wave absorbent is further provided along the outer peripheral portion.

3. The permanent magnet recovery device according to claim 1, wherein the permanent magnet holder is a predetermined rotating electrical machine rotor.

4. A permanent magnet recovery method comprising:

a high-frequency wave absorbent attachment step of attaching a cylindrical shaped high-frequency wave absorbent to each end portion of a permanent magnet holder, in which a permanent magnet is attached to a laminated steel sheet, having an insulating film, via a resin material, in a lamination direction of the laminated steel sheet such that the high-frequency wave absorbent contacts at least the resin material; and a microwave heating step of heating, in a microwave heating furnace, the permanent magnet holder to which the high-frequency wave absorbent has been attached in the high-frequency wave absorbent attachment step, wherein the high-frequency wave absorbent is heated, the resin material is heated by heat from the heated high-frequency wave absorbent, by which the permanent magnet is recovered without of degrading the properties of the permanent magnet.

5. The permanent magnet recovery method according to claim 4, wherein the laminated steel sheet of the permanent magnet holder has an outer peripheral portion and the high-frequency wave absorbent is further provided along the outer peripheral portion in the high-frequency wave absorbent attachment step.

6. The permanent magnet recovery method according to claim 4, wherein the permanent magnet holder is a predetermined rotating electrical machine rotor.

* * * * *